Patented July 1, 1952

2,602,071

UNITED STATES PATENT OFFICE 2,602,071

COPOLYMERIZATION OF VINYL MONOMERS WITH FATTY OILS, FATTY ACIDS, RESINS AND THE LIKE

Edward C. Haines, Moorestown, N. J., assignor to Geo. D. Wetherill Varnish Co., Inc., Camden, N. J., a corporation of New Jersey No Drawing. Application March 23, 1949, Serial No. 83,094

7 Claims. (Cl. 260—23)

This invention relates to copolymerization of vinyl monomers with fatty oils, fatty acids, resins and the like for the production of liquid copolymers suitable for use in paints and varnishes and in the manufacture of other products.

It is well known that under certain conditions an alkyd resin, such as glyceryl phthalate and a fatty oil may be combined in an esterifying reaction with evolution of water and that the resulting ester or resin, if normally liquid, may polymerize to form a gel, and in my prior Patent 2,396,698, granted March 19, 1946, I have disclosed a process for preparing oil modified alkyd resins of this type and have set forth certain precautions which should be observed to avoid polymerization and hence gelation of the resinous ester produced.

In accordance with the present invention, however, esterification does not occur and as water is excluded from the reacting mass the copolymerization of the starting materials is carried out in an anhydrous system and under conditions such that there results a clear homogeneous reaction product liquid at the reaction temperature and having no tendency to form a gel; these products, some of which may solidify to thermoplastic resinous solids at normal temperature exhibit numerous desirable properties when dispersed in a suitable solvent and employed in paint, varnish or the like, while some of the copolymers obtainable in accordance with the invention may be used to advantage in industry otherwise than as coating materials.

A principal object of the invention therefore is the production of clear, non-gelling copolymers of certain classes or groups of compounds as well as the provision of a novel method adapted for that purpose.

A further object is the provision of a novel method of copolymerizing a vinyl compound or the like with a fatty oil, fatty acid, resin or generally similar material capable of forming copolymers with the vinyl compound selected.

Attempts have heretofore been made to produce copolymers of the nature of those to which the invention relates and certain processes have met with some success in the laboratory, notably those in which solvents are used as vehicles for the reactants and reaction products and those employing catalysts, either supplied from an independent source or produced internally by first subjecting one of the reactants, usually an oil, to preliminary partial oxidation resulting according to one authority in formation of peroxide, hydroperoxide and epoxy groups which then act as catalysts in subsequent copolymerization with a vinyl compound such as styrene.

In accordance with the present invention, however, solvents are not utilized and no catalysts, either external or internal are required, the novel method it contemplates producing copolymers continuously and with desirable properties inherently fixed, thus rendering the product immediately available for use in industry without further treatment.

It is therefore another object of the invention to provide a novel method of copolymerizing vinyl compounds and materials copolymerizable therewith to produce directly clear copolymers of the desired properties free of solvents, catalysts or the like.

A further object is to produce with the aid of said method certain copolymers heretofore unknown and unobtainable which afford opportunities for improvement in the paint and varnish industry and in the production of a wide range of products useful therein and/or in other industries.

A still further object is to provide a method of producing initially a "seed" quantity of the reactive mass essential to the continuous practice of the principal continuous method contemplated by the invention.

Other objects, purposes and advantages of the latter will hereinafter more fully appear or will be understood as the following description of a satisfactory manner of practising it proceeds, reference being made by way of example particularly to copolymerization of styrene with China-wood oil, both well known products readily available in the market in satisfactory degrees of purity, since styrene is deemed typical of the vinyl compounds and China-wood oil of the fatty oils which may be copolymerized in accordance with the invention, this oil exemplifying as well the resins and fatty acids which may be copolymerized with vinyl compounds by like procedures.

In initiating continuous practice of the method it is essential first to obtain at least a small quantity of the copolymer to be produced; this "seed" material may be prepared in a batch process, which while somewhat more complicated than the continuous one which may be initiated after the seed material has been produced, is essential to the practice of the method in obtaining a continuous yield of such copolymers as have not been previously known or of which no existing supply is available.

Thus for the production of copolymers of styrene and China-wood oil, I may preliminarily prepare at room temperature a mixture of 5 parts by weight of each of these materials, this mixture being hereafter referred to as mixture A.

To 5 parts of China-wood oil heated to 400° F. in a suitable container and in an atmosphere of $CO_2$ to prevent oxidation by atmospheric oxygen I add slowly, at the rate of about 1 part per hour or thereabouts 3 parts of mixture A while keeping the temperature of the mix at about 400–410° F. After this stated quantity has been added, the mass still maintained in an atmosphere of $CO_2$ may be allowed to cool and after 15–18 hours at room temperature then reheated to about 380° F. and 2 parts more of mixture A added slowly, at the rate of about one-third to one-half part per hour, keeping the temperature at about 380–400° F.

Two and a half parts of mixture A and three-fourths part of styrene are now combined to form mixture B and one and one-fourth parts of this mixture added slowly to the mass at the rate of 1 part or less per hour, the temperature being maintained at about 380–400° F. At the completion of this addition it may be found the entire mass has gelled, in which case the temperature is increased fairly rapidly to about 560° F., or until the gel is broken down, at which point the mass is cooled rapidly to 420° F., the heating to 560° F. and subsequent cooling to 420° F. together requiring in the aggregate about 20 minutes, that is about 15 minutes for heating and about 5 for cooling.

Thereafter the remaining 2 parts of mixture B are added at the somewhat more rapid rate of about 4 parts per hour and heating is then discontinued. Next, after about 16 hours at room temperature, the mass is again reheated to about 400° F., and two and one-half parts of mixture A are slowly added at the rate of about 1 part or less per hour, or about 3 hours for the entire addition. Four parts of the mass are now removed, cooled rapidly to room temperature and 1 part of styrene monomer stirred into it, forming mixture C the entire quantity of which is now added at the rate of about 2 parts per hour to the mass at 400–420° F. About one-half hour later heating is again discontinued and the resulting mass, containing in this instance about 91½% of styrene-China-wood oil copolymer allowed to attain room temperature.

This material, which is homogeneous, substantially clear and transparent, color 3 on the Helligeklett scale with acid number 4.78 and viscosity Z6 plus 4 bubbles on the Gardner-Holdt scale, is substantially identical with the product of my continuous process which may now be commenced using the said material as a seed or vehicle for the continuous reaction.

In initiating the operation of the latter a convenient quantity of this seed material is heated to and maintained at a temperature preferably of about 400° F. in a suitable container while there is being slowly and continuously added to it a mixture comprising, for example, 2 parts China-wood oil and 1 part styrene monomer at a rate of addition desirably such that the proportion of unreacted material to the entire mass is kept low and the concentration of unreacted styrene in the latter is therefore always still lower. Consequently after the mass in the container has attained a sufficient volume, it may be withdrawn at substantially the same rate as the oil-styrene mix is being added so as to maintain it thereafter at a substantially constant volume. When the outlet from the container is fairly remote from the point at which the unreacted oil-styrene mix is added little if any of the latter is withdrawn as such and substantially all the added material enters into the copolymerization reaction before reaching the discharge port of the container in which a transit time of about 12 hours is desirably maintained. However, to insure complete copolymer formation and combine any unreacted styrene possibly retained in the product the latter may be carried through a second container preferably maintained at about 400° F. in a transit time of about 3 hours more or less while a relatively inert gas such as $CO_2$ or nitrogen is bubbled through the mass to effect its constant agitation and maintain it in an inert atmosphere to inhibit its oxidation by atmospheric oxygen.

The temperature at which the copolymerization is maintained is preferably just sufficient to cause the reaction to proceed at a moderate rate and is therefore dependent somewhat upon the specific ingredients entering into the reaction and the proportions thereof supplied. Thus when styrene and linseed oil are copolymerized in accordance with the invention at temperatures as low as 350° F. the reaction proceeds relatively slowly but otherwise satisfactorily whereas when the charging materials contain di-vinyl benzene or a bodied wood oil it is usually necessary to maintain a temperature of about 450° F. or higher in the mass to effect adequate copolymerization.

Moreover while in the example cited 2 parts of China-wood oil and 1 part of styrene monomer formed the charging mixture, larger proportions of China-wood oil up to 90%–95% thereof or smaller proportions as low as 10%–20% with the remainder styrene may be employed to produce correspondingly different copolymers, but when the proportion of styrene is less than about 33⅓% the copolymers may exhibit gelling tendencies on prolonged heating. More specifically, a mixture of China-wood oil and styrene monomer containing 90% of the former and 10% of the latter copolymerized at a temperature of about 400° F. with a turnover time of about 5 hours results in a clear fluid copolymer having a viscosity of 27, an acid number of 3.5 and a color of 13 (Gardner) with a non-volatile content of 98.5%. This product is useful in the manufacture of varnishes under circumstances in which China-wood oil alone cannot satisfactorily be employed on account of its rapid rate of bodying. Thus an excellent 20 gal. varnish may be made with it and a maleic modified rosin ester, although the latter cannot be combined with raw China-wood oil to make a useful product.

When there are employed in the initial feed relatively smaller proportions of China-wood oil, for example about 20%, at somewhat lower temperatures in the reacting mass, a clear resin is produced having a non-volatile content of 96.4% and acid number 3.66 which is solid at room temperature and in a 70% solution in mineral spirits has a viscosity of 46.3 poises and a color of 13; in a solution in xylol a precipitate may be formed when diluted with mineral thinner.

The copolymer formed with 66⅔% raw China-wood oil and 33⅓% styrene has a non-volatile content of about 94%, an acid number 5.41, color 13 and viscosity 0.7 poises at 70% solids in mineral spirits; it produces an excellent varnish, while one with faster drying time may be made if there is substituted for the raw China-wood oil in the copolymerization feed a bodied China-wood oil obtained by initially heating the oil to 450° F. and maintaining it at that temperature for about 30 minutes, then chilling it with a sufficient quantity of the raw oil to bring to consistency to about 6.0 poises. When 66⅔% of this bodied oil and 33⅓% styrene monomer is used in the copolymerization feed and the reacting mass maintained at about 450° F. with a turnover time of about 12 hours, a copolymer results having non-volatile content 97.5% and in a solution of mineral thinner containing 70% solids its consistency is 8.84 poises with a color 13. The acid number of this product is about 5.61.

When materials other than China-wood oil are employed, for example alkali refined linseed oil copolymerized with about an equal quantity of styrene monomer at a temperature of 400° to 420° F. with turnover time of about 25 hours, a clear viscous copolymer is obtained having non-volatile content 96.5%, viscosity 28.5 poises, acid number 3.35 and color 14.

Oils other than those to which specific reference has been made may of course be employed and for the styrene in the feed mixture di-vinyl benzene may be substituted in whole or in part. Thus a copolymerization feed comprising 50% distilled tall oil, 40% styrene and 10% of a mixture consisting of 40% di-vinyl benzene and 60% ethyl styrene, in a pre-formed copolymer made from the same ingredients, at a temperature of 450° F. and turnover time of about 13 hours, produced a copolymer of non-volatile content 93.8%, acid number 100, viscosity 36.2 poises at 80% solids in mineral spirits and color 14.

While I have herein suggested ranges of proportions of certain ingredients which may be employed in accordance with the invention for producing copolymers and which include, for example, China-wood oil-styrene mixtures containing but very little of one and correspondingly more of the other, as a practical matter copolymers made using these proportions may be of little, if any, commercial value; those made from mixtures containing less than about 30% of the oil show progressively decreasing compatibility with drying oils and petroleum solvents as the proportion of China-wood oil is decreased below 30% while those made from mixtures containing more than 90% of the oil, although clear products appear to have but relatively limited practical usefulness for economic reasons.

Substantially any of the copolymers produced in accordance with the invention may be used as a base for paints or varnishes, having properties superior to corresponding copolymers made from the same starting materials but copolymerized or attempted to be copolymerized with the aid of catalysts, solvents or the like; moreover they differ markedly in physical properties as well as in chemical characteristics from the alkyd-resinous products produced in an esterification reaction in accordance with my said prior patent, since while the procedures employed therein and in the present method are in certain aspects mechanically analogous, in the latter esterification, essential in the patented method, is wholly avoided and the only reaction occurring as far as can be ascertained by known testing methods is one of copolymerization in which the molecules of the vinyl compound and the oil or resinous modifying agent instead of reacting only with themselves to form a mixture of individual copolymers seem to react together to form the copolymer as a clearly distinct compound inheriting some of the characteristics of each of the parent compounds but unlike either of them or a mixture of their individual polymers and wholly distinct from products of any known esterification reactions which may be entered into by either.

Thus where 1 part glyceryl phthalate and 2 parts China-wood oil are subjected to esterification in the manner described in said patent the product is an oil modified resin having an acid number 54 which was reduced to 33 on heat treatment at 450° F. for 40 minutes at which time the product started to gel.

A copolymer of 1 part styrene and 2 parts China-wood oil produced in accordance with the present method however and having a substantially lower initial acid number may be maintained at 450° F. indefinitely without exhibiting any tendency to gel and without appreciable reduction in its acid number.

It is accordingly apparent the present method, although involving mechanical steps somewhat similar to generally corresponding ones in the said patented method produces different results because it proceeds by copolymerization of the materials whereas the patented method proceeds by polyesterification. Continuous copolymerization in accordance with the present method proceeds most satisfactorily when an initial bulk of the reaction mixture is preformed copolymer of substantially the same materials and proportions as the feed and the feed of new materials is maintained at a rate substantially equivalent to the rate of copolymerization whereby the proportion of copolymerized to unreacted materials is maintained substantially constant. Thus if $X$ represents the concentration of the vinyl monomer in the mass at any time, for example styrene, the rate of copolymer formation is $K_c(X-X^2)$ where $K_c$ is a constant. As $X$ is less than unity and preferably not greater than about 0.10, $X^2$ is always less than $X$ and when $X$ is reduced below 0.1 $X^2$ becomes progressively still smaller so that even though $K_c$ may be small, it always exceeds $K_cX^2$, the rate of formation of polystyrene through interpolymerization of styrene, and sustains copolymerization as the major if not the sole reaction in the mass. Consequently any tendency of the vinyl compound to polymerize independently of the other ingredient is inhibited by the dominant copolymerization tendency while the presence in the reaction mass of but a small quantity of free vinyl compound at any time moreover deters its volatilization despite its normal volatility at the temperatures employed.

It will be appreciated that the procedure herein described for producing an initial seed quantity of the desired copolymer by a batch process is not necessary each time continuous production of the copolymer is initiated provided there is available for use a sufficient quantity of the latter; furthermore, it is obvious from what has been said regarding the desired relation between rate of feed and volume of the reacting mass that to produce a high rate of yield a correspondingly large reacting mass is required, but this may readily be developed from an initially relatively small quantity of the copolymer by feeding to it the vinyl compound and fatty acid, oil or resin in accordance with the principles and under the conditions herein described while withdrawing a lesser quantity of the mass or none at all until the latter has reached the volume required to give a satisfactory yield.

Moreover, while I have described in considerable detail one method I have followed for initially synthesizing a copolymer in a batch operation it will be apparent other methods for obtaining the requisite quantity of seed copolymer may be devised or changes and modifications introduced in the one I have described. The end product of the batch method, while equally useful with the product of the continuous method, is of course more difficult to obtain and the said or any other batch method will therefore ordinarily be employed as a starting point for the continuous method only when insufficient of the desired copolymer is otherwise available for the purpose.

It will also be apparent that while I have herein described the practice of the invention in the production of copolymers particularly of styrene and China-wood oil these materials are merely exemplary of the classes of compounds to which they belong and like procedures may be employed for obtaining copolymers of other materials in their respective classes. Moreover as resinous monomers respond to treatment in accordance with the invention similarly to China-wood oil and other fatty oils, they may be deemed for purposes of the invention in the same general class as the latter and the procedure specifically described therefore exemplifies copolymerization of a vinyl compound with either a fatty oil or with a resinous monomer. Thus among other materials represented herein by China-wood oil may be mentioned oiticica oil, tall oil, rosin and polycarboxylic-poly alcohol resins and derivatives of these latter materials and in some instances slight modifications of procedure may be desirable when one of these is employed.

Furthermore, divinyl benzene as indicated in one example may be contained in a mixture of vinyl compounds which may be employed although it usually requires somewhat higher temperatures than styrene, up to about 450° F. in the reaction mass, and other vinyl compounds substituted for or mixed with styrene in the feed may require similar simple modifications in procedure.

It is therefore to be understood the invention is not to be deemed as limited or confined in any way to the specific disclosure herein recited as wide latitude in the selection of starting materials is afforded to enable the production of numerous specifically different copolymers adapted for various uses while changes and modifications in the specific steps in the method itself will readily occur to those skilled in the art and may be made if desired without departing from the spirit and scope of the invention as defined in the appended claims.

Having thus described my invention, I claim and desire to protect by Letters Patent of the United States:

1. The method of producing a copolymer of styrene and a monomer selected from the group consisting of China-wood oil, oiticica oil, tall oil and rosin which comprises the steps of continuously adding to a mass of the copolymer maintained at a temperature substantially above its temperature of solidification, a mixture consisting of styrene and said monomer in proportions such as to maintain in the mass a substantially constant ratio between the styrene, said monomer and the copolymer, that ingredient of the mixture entering less readily than the other into a copolymerization reaction with such other being present in the mass in relation to such other in proportion larger than the proportion thereof entering into the reaction, continuously withdrawing from the mass a volume of fluid substantially equivalent to the volume of said mixture being added thereto and consisting substantially of the copolymer with not in excess of 10% of unpolymerized styrene and said monomer.

2. The method defined in claim 1 including the step of maintaining the fluid withdrawn from the reacting mass at a temperature of approximately 400° F. for approximately 3 hours subsequent to its withdrawal while agitating it in the presence of a gas inert with respect thereto.

3. The method as defined in claim 1 in which the reacting mass is maintained at a temperature between 350° F. and 450° F.

4. The method defined in claim 1 in which the volume of the reacting mass is maintained at a ratio to the mixture being added thereto such that at no time during the progress of the reaction the unpolymerized portion of the said mixture comprises a proportion of the mass in excess of 10% thereof by weight.

5. The method defined in claim 1 in which the said mixture is fed to the reacting mass and the material of the latter withdrawn at a rate such that a volume of the mixture substantially equal to that of the mass is fed to the latter in a period of approximately 12 hours.

6. A method of producing a chemically homogeneous copolymer of styrene and a monomeric substance from the group consisting of China-wood oil, oiticica oil, tall oil and rosin which comprises the steps of maintaining a mass of a copolymer of said materials at a temperature substantially above its temperature of solidification, supplying said materials thereto in quantities such that in the reaction mixture the less reactive of said materials is present in proportion sufficiently greater relatively to the other material than the proportion relatively thereto at which it enters into copolymerization reaction therewith that copolymerization predominates in the reacting mass and excludes homopolymerization of the more reactive material, said relative concentrations of the monomeric materials automatically maintaining in the mass a concentration of total uncopolymerized materials not in excess of 10%.

7. The method defined in claim 6 in which the reactants are styrene and China-wood oil.

EDWARD C. HAINES.

REFERENCES CITED

The following references are of record in the file of this patent:

UNITED STATES PATENTS

| Number | Name | Date |
|---|---|---|
| 1,975,959 | Lawson et al. | Oct. 9, 1934 |
| 2,363,951 | Fikentschev | Nov. 28, 1944 |
| 2,396,698 | Haines | Mar. 19, 1946 |
| 2,451,435 | Elwell et al. | Oct. 12, 1948 |
| 2,468,748 | Griess et al. | May 3, 1949 |
| 2,496,384 | De Nie | Feb. 7, 1950 |

FOREIGN PATENTS

| Number | Country | Date |
|---|---|---|
| 573,835 | Great Britain | Dec. 7, 1945 |